United States Patent [19]
Glezer et al.

[11] Patent Number: 6,109,222
[45] Date of Patent: Aug. 29, 2000

[54] MINIATURE RECIPROCATING COMBUSTION-DRIVEN MACHINERY

[75] Inventors: Ari Glezer; Mark G. Allen, both of Atlanta, Ga.

[73] Assignee: Georgia Tech Research Corporation, Atlanta, Ga.

[21] Appl. No.: 09/197,726

[22] Filed: Nov. 28, 1998

Related U.S. Application Data

[60] Provisional application No. 60/065,447, Nov. 24, 1997.

[51] Int. Cl.[7] ................................................ F02B 71/00
[52] U.S. Cl. .................................... 123/46 R; 123/46 E
[58] Field of Search ............................. 123/46 R, 46 A, 123/46 E, 55.2, 55.5, 55.7

[56] References Cited

U.S. PATENT DOCUMENTS

| | | | |
|---|---|---|---|
| 2,678,032 | 5/1954 | Mallory | 123/46 R |
| 3,105,153 | 9/1963 | James | 123/46 R |
| 4,142,485 | 3/1979 | Moiroux et al. | 123/46 R |

*Primary Examiner*—Marguerite McMahon
*Attorney, Agent, or Firm*—Thomas, Kayden, Horstemeyer & Risley, L.L.P.

[57] ABSTRACT

A reciprocating micro heat engine for electrical and mechanical power generation is disclosed The micro heat engine uses a reciprocating free piston that is driven by a periodic combustion process, and is implemented using micromachining technology. In the application of electrical power generation, the mechanical and electrical functionality of the engine are highly integrated; i.e., the same piston performs both the fuel-to mechanical energy conversion as well as the mechanical-to-electrical energy conversion.

22 Claims, 9 Drawing Sheets

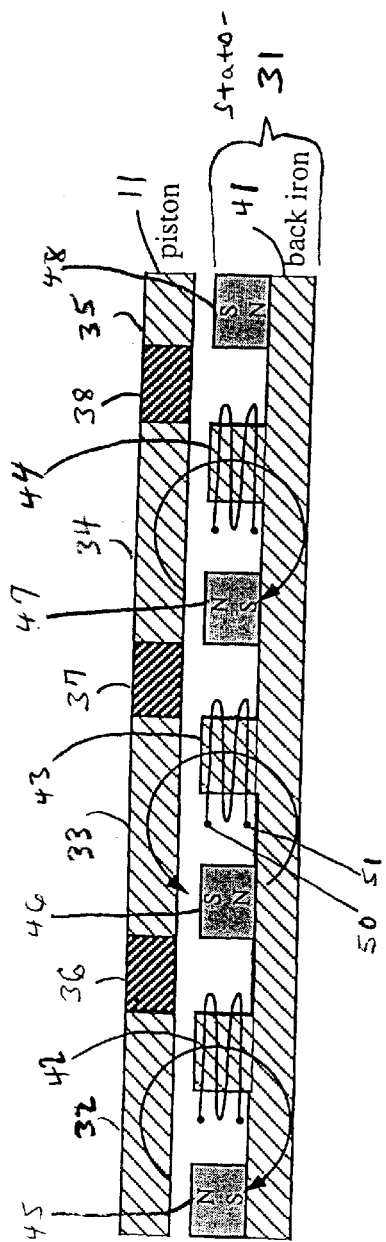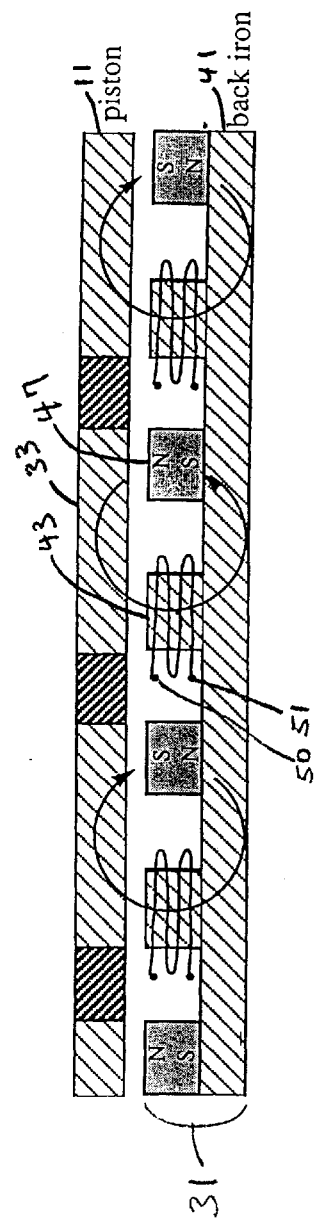
FIG. 4A
FIG. 4B

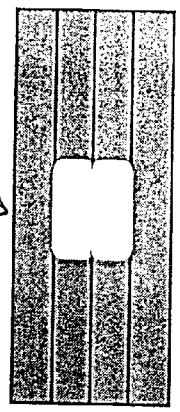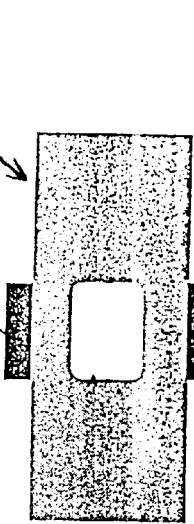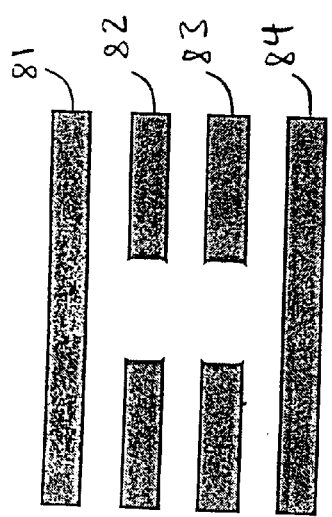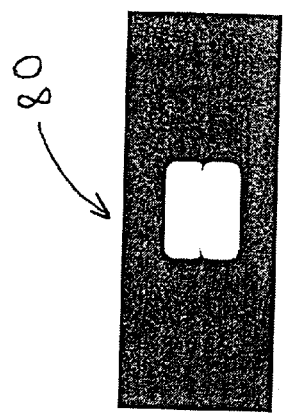

MINIATURE RECIPROCATING COMBUSTION-DRIVEN MACHINERY

CROSS REFERENCE TO RELATED APPLICATIONS

The present application claims priority to and the benefit of the filing date of Provisional Patent Application Ser. No. 60/065,447 filed Nov. 24, 1997, entitled "Miniature Reciprocating Combustion-Driven Machinery," which, in its entirety, is hereby incorporated by reference in this application.

FIELD OF THE INVENTION

The present invention generally relates to the field of electrical and mechanical power generation, and in particular to a reciprocating micro heat engine for generating electrical and mechanical power.

BACKGROUND OF THE INVENTION

Currently batteries are the primary source of power for applications requiring small, compact power sources. However, batteries have numerous limitations as compared to fuel-driven power sources such as motors and generators. Compared to these alternate energy sources, batteries have relatively lower electrochemical energy density, and must either be replaced periodically or recharged, which typically is more time consuming than simply refueling a fuel-driven power source. Thus, there is a need for miniature energy sources for the delivery of electrical and/or mechanical energy that have the superior attributes of fuel-driven motors and generators, and which can also be fabricated in similar sizes and shapes to batteries. Such miniature energy sources would have distinct advantages over batteries, such as the ability to exploit the large energy densities of fuels (compared to the relatively lower electrochemical energy density of batteries), and the ability to quickly recharge or refill the energy storage medium (e.g., a fuel reservoir), thereby overcoming the relatively long times required to recharge a battery system.

As known in the art, microfabrication processes are utilized to construct miniature devices that can be batch fabricated at a relatively low cost. In this regard, multiple devices are typically manufactured on a single wafer during microfabrication. Well known microfabrication techniques are used to form similar components of the multiple devices during the same manufacturing steps. Once the multiple devices have been formed, they can be separated into individual devices. Examples of microfabrication techniques that allow the batch fabrication of multiple devices include, but are not limited to, sputtering, evaporation, etching, electroforming (e.g., electroplating, electrowinning, electrodeposition, etc.), packaging techniques (e.g., lamination, screen printing, etc.), photolithography, and thick or thin film fabrication techniques. Since a large number of devices can be formed by the same microfabrication steps, the cost of producing a large number of devices through microfabrication techniques is less than the cost of serially producing the devices through other conventional techniques. It is therefore desirable, in many applications, to fabricate devices through microfabrication techniques.

Recent advances in microfabrication technologies have enabled the realization of miniature power sources for the conversion of fuel energy to electrical and/or mechanical energy. It is the purpose of this invention to apply such microfabrication technologies to the realization of compact power sources.

SUMMARY OF THE INVENTION

As will be explained more fully hereinafter, the present invention is a reciprocating micro heat engine for electrical and mechanical power generation. The approach to micro heat engines described here is unique in the sense that (1) it uses a reciprocating free piston that is driven by a periodic combustion process; (2) it is implemented using micromachining technology; and (3) in the application of electrical power generation, the mechanical and electrical functionality of the engine are highly integrated; i.e., the same piston performs both the fuel-to-mechanical energy conversion as well as the mechanical-to-electrical energy conversion. Other than the reciprocating piston, the machinery can be constructed such that the only other moving parts in the engine are optional fuel control and passive flapper mixing valves; even these types of passive valves are not required if the piston itself is used to alternately cover and uncover fuel inlet and exhaust ports during its reciprocating motion.

In the engine, a piston is free to move in a complementary surrounding channel. The piston is placed between two combustors, operating in a pulsating mode, with means for introducing fuel and air and igniting combustible mixtures. When the piston is at one extreme of its motion, the combustible mixture inside the smaller volume combustor is ignited, and the ensuing combustion process and pressure increase propel the piston towards the other end of the chamber. Just as the piston reaches the other end of the chamber, the combustible mixture that has formed during the motion of the piston in the opposite combustor is ignited, sending the piston back. By appropriate timing of the combustion, the piston is forced to reciprocate back and forth between the two pulsating combustors.

The combustors at either end of the piston may incorporate a small enclosed mixing-combustion section in which the combustion starts. In this case, the combustion process will expand into a larger combustion section that surrounds the mixing-combustor section where combustion will be completed and the products cooled by mixing with excess air, resulting in a maximum gas temperature that is estimated to be below 300° C. The pulsating combustion process will be accompanied by a pressure rise sufficient to drive the piston to the other end of the chamber. The frequency of oscillation can be adjusted by controlling the timing of the combustion.

The motion of the piston is utilized to generate either mechanical or electrical energy. For mechanical energy generation, mechanical output in the form of piston motion or fluidic output (e.g., combustion jets or synthetic jets) may be used. For electrical energy generation, either a permanent magnet generator or other schemes well-known in the art can be used. In a preferred embodiment, the magnetic circuits are arranged such that the permanent magnets (if used) are not on or an integral part of the piston, but instead are embedded in the external walls of the generator, and can be, thus, insulated from the high temperature regions of the generator. In addition, the use of pulse combustion results in lower combustion process and wall temperatures due to cooling of the combustion products and wall by mixing and contact with cool air, respectively. The mean operating temperatures can be on the order of 100–300° C. range. One unique advantage of using micromachining technology is the large degree of integration of the mechanical and electrical functionality of the generator; e.g., the same piston which converts the combustion energy to mechanical energy also acts to convert mechanical energy to electrical energy; no coupling shaft or other means to connect a separate mechanical-to-electrical energy converter to the combustion chamber is required.

The generator is fabricated using micromachining technology. Micromaching can be defined as the use of microfabrication technologies (as discussed in the Background of the Invention section above) to create mechanical structures in a variety of materials, potentially in addition to electronic devices. In particular, a multilayer ceramic tape technology, commonly used in electronic packaging, is a preferred method to form the high temperature regions of the generator as well as to wind dense, micro electro mechanical systems (MEMS)-based coils for the electrical power pick-off. This technology is combined with pressure lamination and/or electroplating of magnetic materials, and the optional integration of high temperature, high energy permanent magnet materials such as samarium cobalt alloys (which retain their favorable magnetic properties to temperatures as high as 300° C.). An additional advantage of using MEMS technology is that a large number of magnetic power generation poles can be realized in a relatively small space, allowing the piston to move at a relatively low frequency while generating power at a much higher frequency. This frequency multiplication results in a favorable mechanical-to-electrical impedance transformation.

The numerous objects, features, and advantages of the present invention will become apparent to one with skill in the art upon examination of the drawings and the following detailed description. Any and all additional objects, features and advantages which may become apparent are intended to be included herein within this disclosure.

BRIEF DESCRIPTION OF THE DRAWINGS

FIGS. 4A–4B are schematic diagrams of an embodiment of the electrical portion of a miniature reciprocating combustion-driven machine in accordance with the present invention;

FIGS. 8A–8D are schematic diagrams illustrating the fabrication sequence for a ceramic-tape based micromachined pressure sensor in accordance with an embodiment of the present invention;

DETAILED DESCRIPTION OF THE PREFERRED EMBODIMENTS

Figure 1:
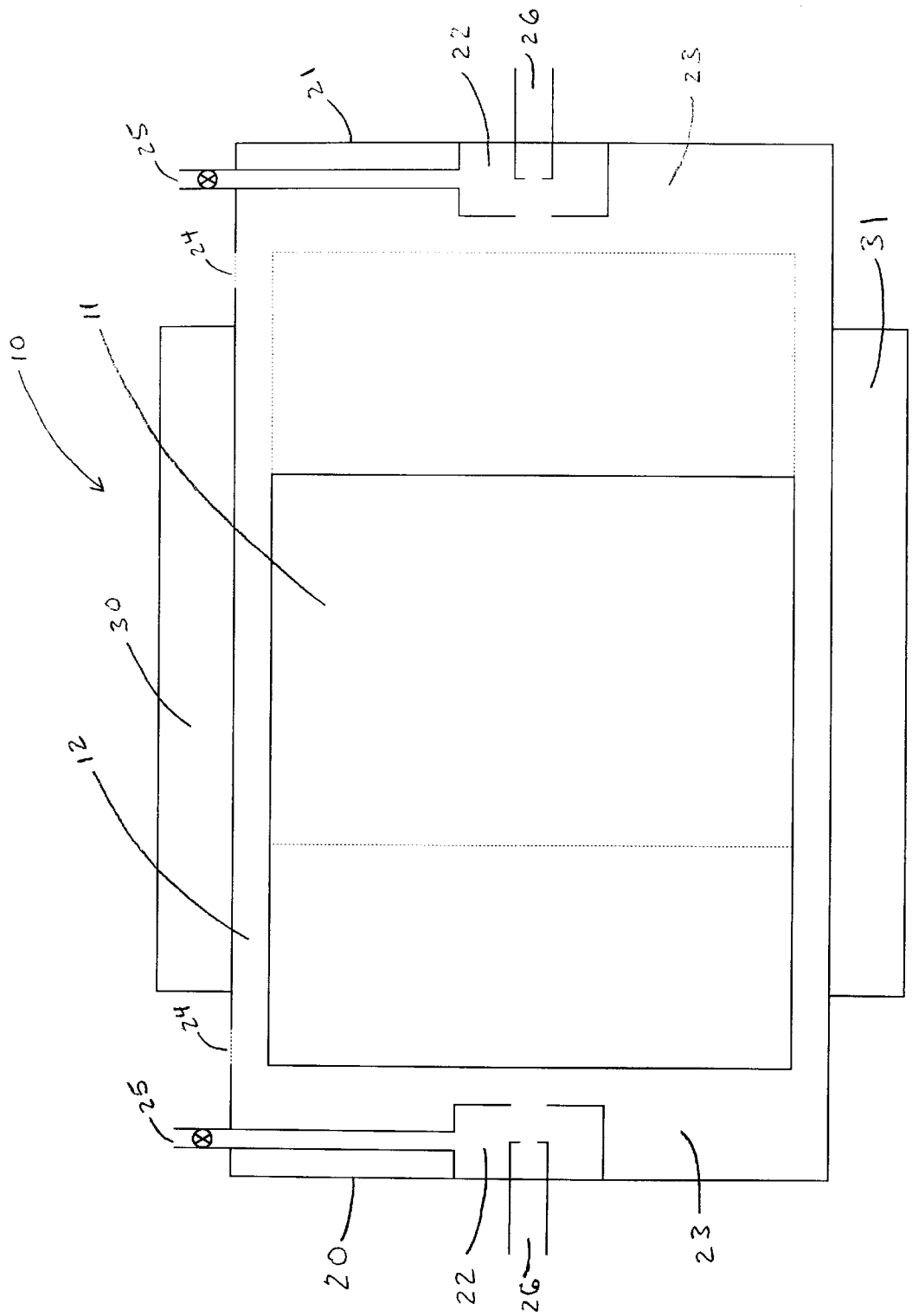
FIG. 1 is a simplified schematic diagram of a two-stroke implementation of a miniature reciprocating combustion-driven machine in accordance with an embodiment of the present invention.

With reference now to the drawings wherein like reference numerals designate corresponding parts throughout the several views, a preferred embodiment of the present invention is a pulse-combustion-driven electrical generator fabricated using a combination of MEMS, electronic packaging, and conventional fabrication technology. A conceptual view of the generator is shown in FIG. 1. A prismatic piston 11 is free to move in a complementary surrounding channel 12. In a preferred embodiment, the piston 11 is a rectangular plate, although any suitable piston may be used without departing from the or scope of the invention. The piston 11 is placed between two pulse combustors 20 and 21. Each of these pulse combustors 20 and 21 consists of a distinct, small mixing-combustion section 22, a larger combustor section 23, an intake/exhaust port 24, means for introducing air and fuel (which in the preferred embodiment is a valve 25), and means for igniting a combustible mixture (which in the preferred embodiment is a spark plug 26). The mixing-combustion section 22 consists of a small, enclosed chamber where fuel can be injected, mixed with air, ignited by a spark plug 26, and burned. The piston 11 is moved back and forth between the combustors 20 and 21 by alternately operating the combustors 20 and 21.

The following describes one cycle of operation initiated by combustion in combustor 20: fuel is injected through valve 25 into the mixing combustion section 22, mixed with air, and ignited by spark plug 26. Ignition is followed by combustion that spreads into the combustor section 23, due to gas expansion, and is accompanied by a pressure increase. The pressure increase pushes the piston 11 away from combustor 20 and toward the opposite combustor 21. When the piston 11 reaches the opposite combustor 21, the process is repeated for combustor 21, thereby propelling the piston 11 back toward combustor 20. Reciprocating motion of the piston 11 is achieved by alternately operating the combustors 20 and 21. Each cycle requires only a small injection of fuel, thereby keeping the total combustor temperature rise low. The motion of the piston 11 is used to generate electricity through electrical transducer regions 30 and 31, as described in greater detail below.

Figure 2:
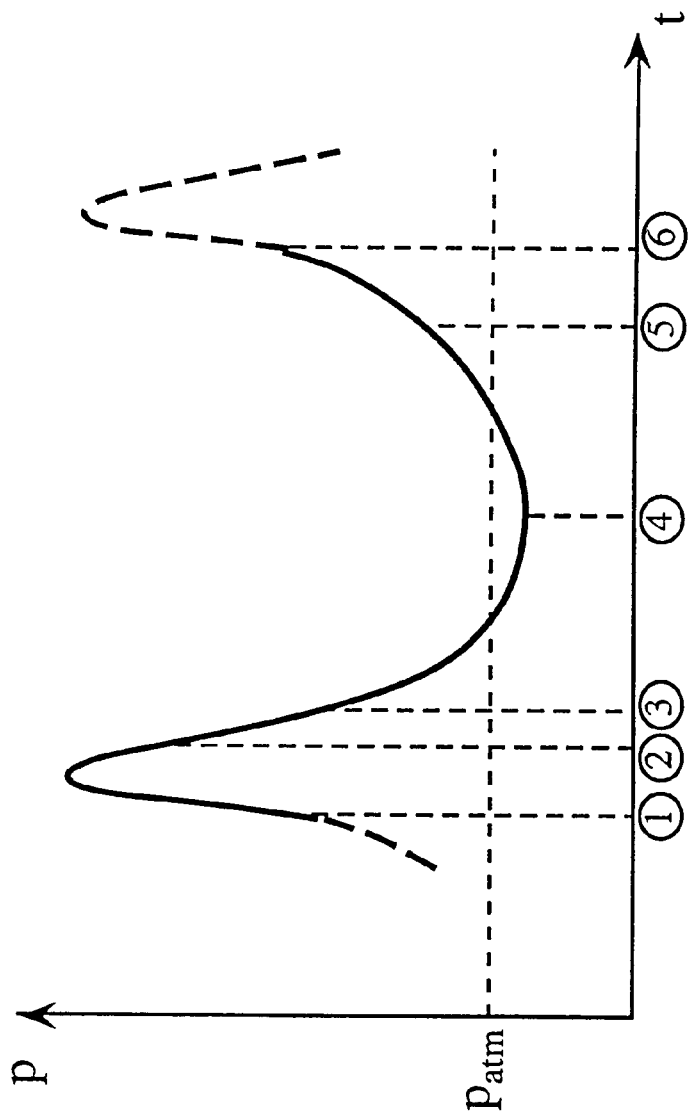
FIG. 2 is a graphic illustration of the pressure-time history of one cycle of the embodiment of FIG. 1.
Figure 3B:
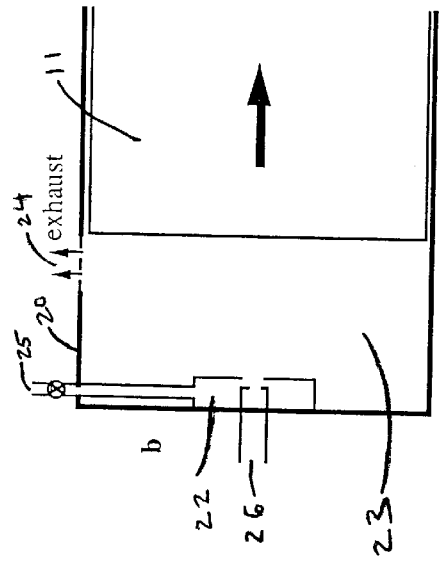
FIGS. 3A–3D are schematic diagrams showing the position of the piston at various stages during one cycle of the embodiment of FIG. 1.
Figure 3D:
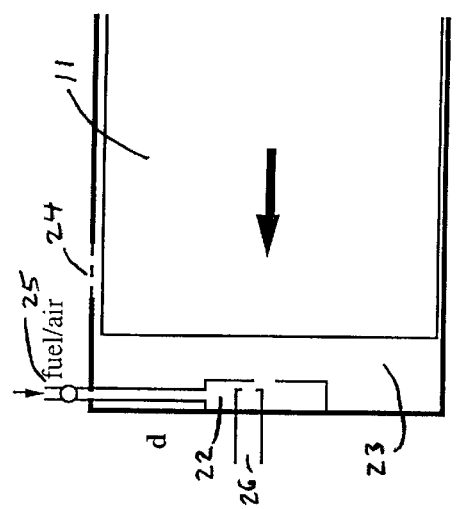
Figure 3A:
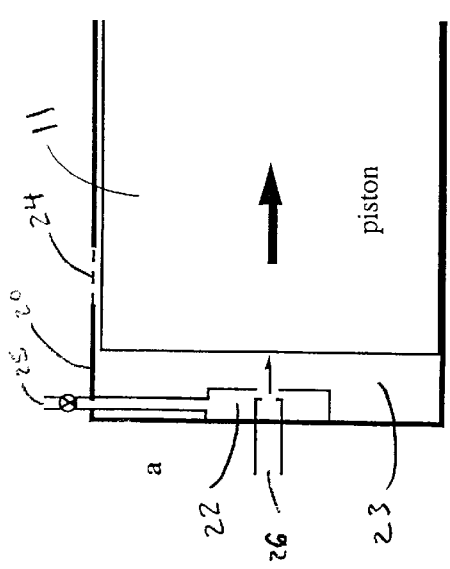
Figure 3C:
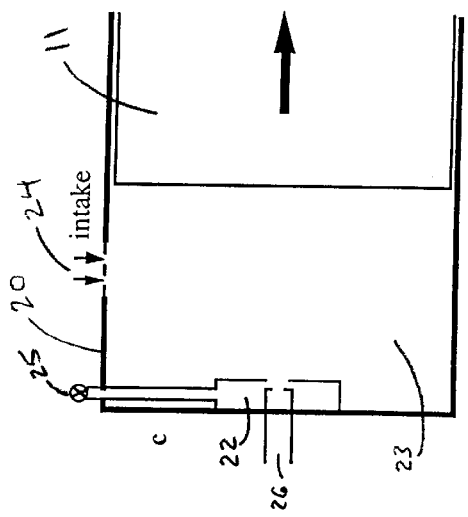

FIG. 2 illustrates the pressure-time history of one of the pulse combustors 20 or 21 during one operating cycle. FIGS. 3A–3D illustrate the position of the piston 11 corresponding to the combustor pressure-time history depicted in FIG. 2. Taken together, FIGS. 2 and 3A–3D illustrate several distinct events that occur during each cycle. At the beginning of the sequence, the piston 11 is located at the end of its (for example) leftmost stroke (FIG. 3A), after its prior motion has compressed the contents of the left combustor 20 to their maximum pressure (e.g., a compression ratio on the order of 2–3:1). At time ti (FIG. 2), the fuel-air mixture is ignited by a spark discharge, resulting in a large increase in the pressure and temperature within combustor 20. This pressure increase forces the piston 11 away from combustor 20 (i.e., to the right), resulting in an increase in volume and decrease in pressure within combustor 20. At time $t_2$ (FIG. 2), the combustion is completed. At time $t_3$ (FIG. 2), the piston 11 has passed the intake/exhaust port 24 in the wall of combustor 20 (FIG. 3B). At $t=t_3$ the pressure in combustor 20 is still greater than atmospheric pressure. This pressure differential causes the products of combustion to be exhausted through port 24, causing the pressure in combustor 20 to decrease further. As the piston 11 continues to move to the right, due to the inertia of the moving piston, the pressure in combustor 20 drops below atmospheric pressure. This pressure differential causes make-up air to be drawn into combustor 20 through port 24 (FIG. 3C), and into the mixing-combustion section 22 of combustor 20 through one or more flapper valves (not shown).

At around time $t_4$ (FIG. 2), ignition of the fuel-air mixture occurs in the other pulse combustor 21 (not shown). As a result, the piston 11 begins moving away from combustor 21 and back toward combustor 20, ultimately closing the intake/exhaust port 24 of combustor 20. Following port closure, the pressure in combustor 20 begins to rise. At time $t_5$ (FIG. 2), fuel is again injected into the mixing-combustion section 22 of combustor 20 (FIG. 3D) by opening the fuel control valve 25. This valve can be external to the generator 10, microfabricated as part of the generator 10, or even omitted entirely if the fuel port is controlled by moving the piston past the fuel injection orifices in a manner similar to that employed to open and close the intake/exhaust port 24. Finally, at time $t_6$ (FIG. 2), the compressed fuel-air mixture within the mixing-combustion section 22 of combustor 20 is (again) ignited, starting a new pulse combustion cycle.

A preferred embodiment for converting the motion of the piston 11 to electrical energy is shown in FIG. 4. This embodiment is for illustrative purposes only, and many other appropriate electrical generation schemes well known in the art could be substituted for the scheme shown in FIG. 4 and discussed herein without departing from the scope of the invention.

With reference to FIGS. 4A and 4B, the piston 11 consists of magnetic regions 32, 33, 34 and 35, which are used to link magnetic flux. In a preferred embodiment, the magnetic regions are formed from a magnetically soft plate comprised of iron or a nickel-iron alloy, although any other suitable magnetic material capable of linking magnetic flux may be used. Interspersed along the axis of the piston 11 with the magnetic regions 32, 33, 34 and 35 are nonferrous regions 36, 37 and 38, which act to isolate the flux-conducting regions of the bar. In a preferred embodiment these nonferrous regions are air, formed by machining slots out of the piston, although other appropriate nonferrous materials (such as aluminum) may be used as well if additional structural strength of the piston is important.

In FIGS. 4A and 4B, the piston 11 forms the rotor of a linear generator 10, and the stator 31 of the generator consists of a back iron 41 upon which conductor-wound "teeth" 42, 43 and 44 alternate with permanent magnets of alternating polarity 45, 46 and 47. For purposes of illustration and clarity, a complementary symmetric stator 30 on the top side of the piston 11, which doubles the electrical output of the generator 10, is not shown in FIGS. 4A and 4B.

The generator 10 operates on the principle of magnetic commutation, which is explained herein with reference to the center coil 43, although it should be clear that the same principle applies equally to each of the other coils 42 and 44. With reference to the center coil 43, when the piston 11 is in the position as shown in FIG. 4A, the center coil 43 is linked via flux-conducting region 33 of the piston 11 to permanent magnet 46, which causes flux to flow through the coil 43 from the bottom to the top. As the piston 11 moves one unit to the right (FIG. 4B), the center coil 43 is linked via flux-conducting region 33 of the piston 11 to permanent magnet 47, which causes flux to flow through the coil 43 from the top to the bottom. This alternating flux through the coil 43 generates a voltage at the coil terminals 50 and 51, from which electrical energy can be extracted. It should be noted from FIGS. 4A–4B that continued motion of the piston 11 to the right until it reaches the end of its stroke, and the subsequent reciprocating motion of the piston as it moves back to the left, results in continued flux variation, and therefore continued electrical power generation. This bidirectionality allows the advantageous situation of the electrical switching frequency of the flux exceeding the mechanical oscillation frequency of the piston.

As discussed above, the generator 10 of FIG. 1 is driven by the periodic motion of the piston 11 between two pulse combustors 20 and 21. The kinetic energy of the piston 11 is used to compress the gas in each of the combustors 20 and 21 alternately. The increase in pressure produced by the pulse combustion is designed to offset piston losses (e.g., friction, heat dissipation) and maintain a constant amplitude of the piston motion. It is noted that the overpressure produced by the combustor can be readily controlled by the amounts and timing of fuel and air injection, ignition time, and the frequency (and thus the power of the generator).

With reference to the embodiment of FIGS. 4A–4B, if the piston 11 is separated from the stator 31 by a gap that is small compared with the length of the magnets, and if the relative permeability of the soft magnetic material segments 32, 33, 34 and 35 is taken to be very large, a time-periodic flux will be generated in each coil winding 42, 43 and 44 that can be approximated (with appropriate electrode shaping as known in the art) by a sinusoidal function. From Faraday's law of electromagnetic induction, the voltage developed in each coil is proportional to the product of the number of turns of the coil, the oscillation frequency, the area of the coil, and the magnetic flux density produced by the magnet and flowing through the circuit. The number of turns of the coil can be estimated either directly from available cross-sectional areas for conventional magnet wire wrapping, or, if MEMS technologies are used to wrap the coils, from minimum specifications on the lateral and vertical pitch achievable (which is, in turn, dependent on the specific fabrication technology used).

The mechanical part of the generator is driven by the time-periodic motion of a free piston between compression cavities where the kinetic energy of the piston is alternately used to compress the gas in the combustor before the combustion takes place. The function of the combustor is to offset losses associated with the conversion to electrical energy (i.e., overcoming the effect of back EMF), heat dissipation, and friction losses and thereby maintain the time-periodic motion of the piston. Pulse combustion is ideally suited for this purpose because the energy release occurs on a time scale that is very short compared to the period of the piston motion and, as a result, the concomitant rise in temperature is relatively low and allows for efficient cooling during the rest of the piston cycle. The overpressure produced by the pulse combustor can be controlled by the choice of combustion process (e.g., diffusion, premixed and catalytic) the amount of fuel and air injected, the ignition timing and the frequency (and thus the power of the generator). Furthermore, since the overpressure necessary to overcome the losses once the periodic motion is established is relatively low, the fuel consumption of this device is also relatively low.

The following discussion relates to the properties of a centimeter-scale reciprocating micro heat engine in accordance with the present invention having dimensions on the order of approximately 10×5×1 cm, inclusive of the combustor and generator. Such a device, with millimeter-scale, high-temperature samarium-cobalt alloy magnets, high saturation flux density magnetic materials, and MEMS-based coils, is capable of generating 10–30 Watts of electrical power with piston oscillation frequencies on the order of 25–50 Hz.

The required pressures that must be generated by the combustor, as well as the system operating temperature, in such a miniature reciprocating combustion-driven machine are determined as follows: the force generated by the inertia of the piston is approximated by calculating the product of the square of the angular frequency, the piston stroke, and the piston mass. For a piston dimension of 6×5×0.2 cm made from a high permeability alloy such as a variety of alloys of nickel, iron, and other trace elements as known in the art, the mass of the piston (neglecting the magnetic saliency features) is 50 grams. Thus, the inertial force on the piston is 20 N. This relatively high inertia is desirable since it will be used, among other things, for compressing air and fuel in the combustor prior to ignition. If hydrogen fuel is stoichiometrically burned in the mixing-combustion section, such that the fuel and oxidizer occupy 20% of the combustor volume, the rise in pressure above the level of the inertial-compressed air in the combustor is on the order of approximately 25 psig. This pressure increase is used to overcome losses involved with maintaining the oscillatory motion of the piston as well as the conversion of mechanical to electrical energy. The corresponding adiabatic rise in temperature is on the order of approximately 500° C. It should be noted that this temperature is much higher than the average operating temperature of the combustor gases, which is on the order of approximately 100° C. This significantly lower temperature is also attributable to the pulsed nature of the combustion, and can be further decreased by operating at lower frequencies. Hydrogen fuel consumption under these conditions is on the order of approximately 5 grams per hour.

It is also instructive to determine the pressure required to drive the piston through the generator section of the device, since withdrawal of the generated electrical power will result in a braking force on the piston. A simple conservation of energy analysis, accounting for the frequency of operation, piston stroke, and piston area, indicates that the overpressure is on the order of approximately 15 psi. This can be supplied under the combustor operating conditions described below.

The frictional force associated with piston motion also can be calculated. Assuming a 10 μm gap between the piston and the combustor wall, and standard film lubrication (which is feasible for this generator since the operating temperature of the piston is relatively low), the average frictional force during a cycle is approximately 1 N. Since the cross-sectional area of the piston is one square centimeter, these losses will require a pressure of approximately 1.5 psi per cycle to overcome. Since this is negligible compared to the combustor-generated overpressures as well as the piston inertia, piston friction will not inhibit the generator's operation so long as appropriate lubrication requirements and technologies known in the art are used.

Although the embodiment described herein focuses both upon electrical power generation as well as a particular generator configuration, other generator designs well known in the art and/or other power output schemes (such as combustion-driven jet, synthetic jet, and direct mechanical linkage to the piston) can be implemented without departing from the scope of the invention.

Pilot experiments have been conducted in a miniature, centimeter scale pulse combustor consisting of a cylindrical volume of about 0.5 cc with a small exhaust orifice. These experiments have demonstrated that a near stoichiometric air-acetylene fuel mixture leads to efficient operation at frequencies as high as 100 Hz (well off resonance) producing more than a 45 psi pressure increase which can readily drive the piston. Furthermore, the mean combustor gas temperature of this pulse combustor is around approximately 300° C. at 100 Hz and around 90° C. at 20 Hz. This mean temperature can be further reduced by operating with leaner mixtures.

Figure 5:
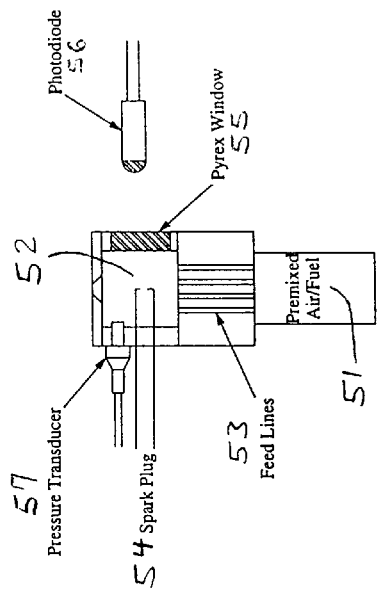
FIG. 5 is a schematic diagram of a miniature, centimeter scale pulse combustor in accordance with the present invention.

A schematic of the combustor used to conduct the pilot experiments is shown in FIG. 5. Premixed fuel and air 51 enters the combustion chamber 52 through a series of feed lines 53, where they are ignited by a spark plug 54. The strong combustion wave causes a rapid jet of burned gases to issue from the feed lines 53. Any combustible mixture re-entering the feed lines 53 is quenched. Heat release rate oscillations during the cycle are measured by recording spontaneous fluorescence emissions through a quartz window 55 using a photodiode 56. Pressure functions are measured using a piezo electric transducer 57. The transducer's sensitivity to temperature allows it only to be used for single shot operation.

Figure 6B:
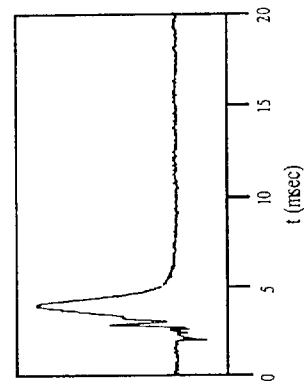
FIGS. 6A–6B are graphical illustrations of the pressure and heat release, respectively, of the combustor of FIG. 5.
Figure 6A:
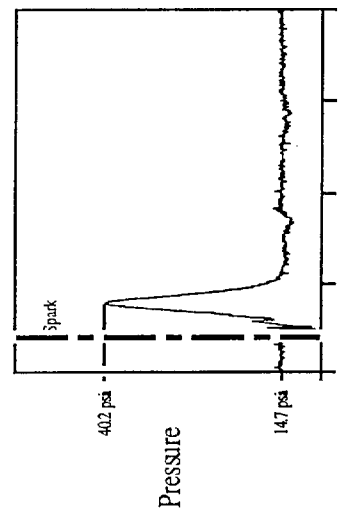

Typical time traces of pressure and heat release are shown in FIGS. 6A and 6B, respectively. For this test in which acetylene was used as the fuel the maximum pressure in the combustor exceeded 40 psi and the combustion process was completed within less than 5 ms.

Although the above-described embodiment is an extremely simple geometry, other embodiments of the miniature reciprocating combustion-driven machine of the present invention, having more complex geometries, also can be used to generate electrical energy and mechanical energy in accordance with the present invention. One embodiment of such a device is a four-stroke implementation of the miniature reciprocating combustion-driven machine, illustrated in FIG. 7. As described below, the operation of this embodiment is quite similar to that of a conventional automobile engine.

Figure 7:
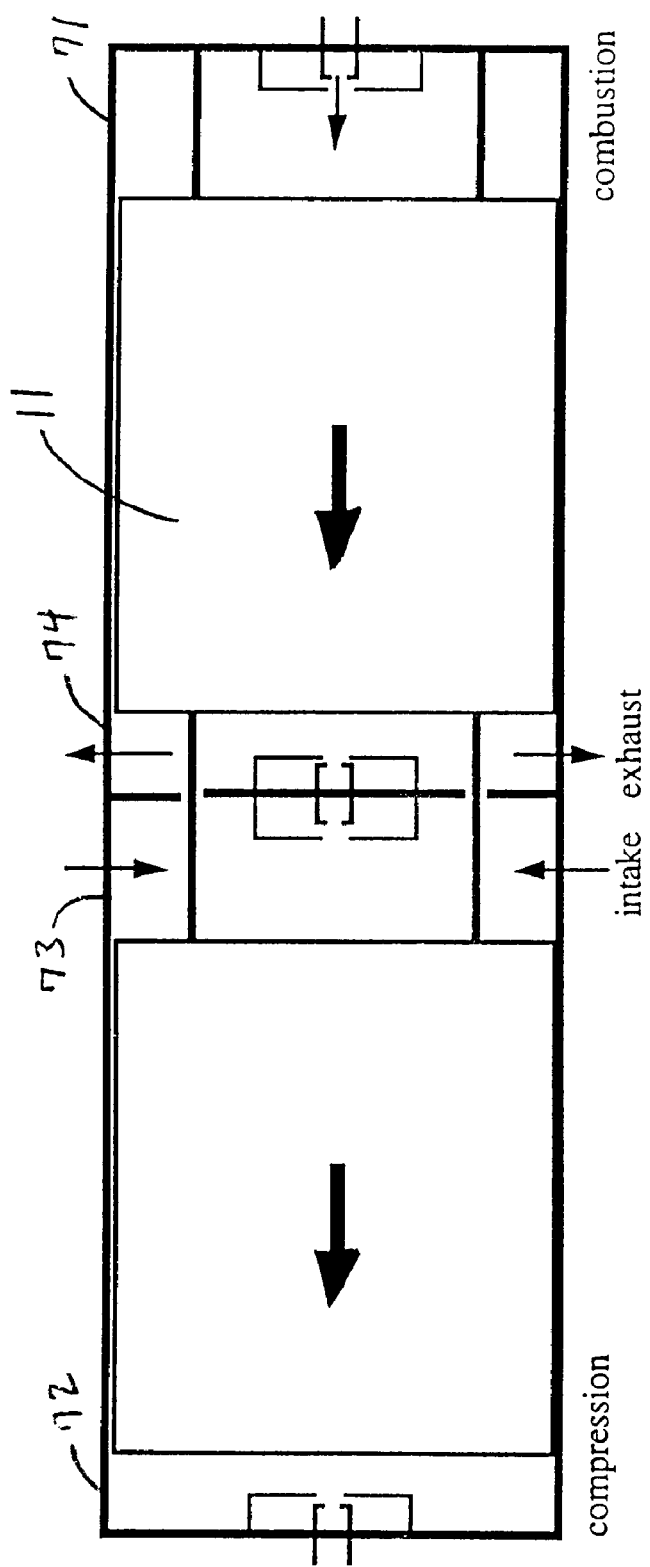
FIG. 7 is a schematic diagram of a four-stroke implementation of a miniature reciprocating combustion-driven machine in accordance with an embodiment of the present invention.

With reference to FIG. 7, the combustors 71, 72, 73 and 74 are ignited in sequence. As depicted in FIG. 7, the fuel/air mixture in combustor is ignited on the left motion of the piston 11, initiating the first cycle. This causes combustor 74 to be completely vented, while the fuel/air mixture in combustor 72 is compressed. The second cycle (not shown) is initiated by igniting combustor 72, whereupon the piston 11 moves to the right, expelling the combustion products in combustor 71 and compressing combustor 73. During the third cycle (not shown), combustor 73 is ignited, expelling the combustion products from combustor 72 and drawing fresh fuel and air into combustor 71. Finally, combustor 74 is fired, which completes the four-stroke cycle. It should be noted that the frequency of operation of the combustors in this configuration is half the mechanical frequency of the piston 11.

Other modifications of the described embodiments will be apparent to those skilled in the art, and such embodiments are intended to be included in this application.

In a preferred embodiment, the generator is fabricated using micromachining technology. Micromachining is traditionally defined as the use of microfabrication technologies to create mechanical structures, potentially in addition to electronic devices. Micro electro mechanical systems (MEMS) are sensors and actuators (or systems containing sensors and actuators) fabricated using micromachining. The use of micromachining gives to MEMS the same advantages which integrated circuits enjoy, namely batch fabrication, and ease of realization and interconnection of large, cooperative actuator arrays. An additional quoted advantage of MEMS is small size. However, it is desirable in many applications (including the present miniature reciprocating combustion-driven machine) to fabricate larger, more robust devices capable of generating or withstanding larger forces and currents per actuator, and also capable of withstanding more aggressive conditions than traditional MEMS devices. There is no conflict between MEMS and these needs for larger (e.g., mm–cm scale), more robust (e.g., non-silicon) devices if micromachining is defined as a set of batch fabrication technologies in the broad sense instead of limiting it to integrated circuit fabrication technologies. For example, there are a number of lithography-based batch fabrication technologies which are currently applied to electronic packaging fabrication which can be adapted to complement traditional MEMS fabrication technologies. Electronic packaging fabrication techniques are commonly and commercially used over large area substrates (e.g., 24×24 inches), and commonly fabricate structures in the mm–cm range. In the fabrication of the miniature reciprocating combustion-driven machine, not only the "traditional" microfabrication technologies, but also these packaging microfabrication technologies (e.g., lamination, and in particular ceramic lamination, electroplating, and large-area lithography), to fabricate MEMS using more robust materials (e.g., ceramics, metals), in larger size ranges, with larger generated forces, and the ability to withstand larger external forces, than those currently available, are applicable.

In a preferred embodiment, the generator of the present invention is fabricated from ceramic MEMS. Ceramics were chosen because they can withstand the operating temperatures of the combustor, and because there is already in place a large manufacturing infrastructure for ceramics in the realization of ceramic-based electronic packages and multichip modules (MCMs).

Ceramic-based MCM's are made using a manufacturing technique that relies on the fusion of a number of layers of pattern, conductor-bearing ceramic tape (this technology is often referred to as cofired ceramic technology). The ceramic tape is an alumina-based ceramic powder, often mixed with powders of various glasses, suspended in the organic binder. In this state, the tape is pliable and cuttable; but it fuses and hardens when fired at higher temperatures, e.g. above 850° C. In a typical process, layers of the tape are patterned to make vias according to the electronic connection requirements of the particular circuit and a metal paste is screen printed onto the layers in the appropriate patterns on the surface of the tape and to fill the vias. The layers of patterned and metallized tape are stacked for proper alignment and laminated in a hydraulic press. The lamination is typically performed under a vacuum at a pressure of 3000 psi and a plate temperature of 70° C. for 10 minutes. The laminated sample is then typically cofired in a belt furnace for 1 hour at 850° C. After cofiring, the ceramic material is very hard. To complete the electronic packaging fabrication sequence, one or more silicon chips are then connected to the metal leads of the package by applying a drop of solder to the bonding pads of the chip and flipping the chip over to meet the metal leads of the package. It is known in the art to have fifty or more ceramic layers in a typical cofired ceramic electronic packaging process.

Micromachined pressure sensors for high temperature application based on this material and fabrication technology can be constructed. In a preferred embodiment, the structure of the sensor is based on a flexible diaphragm with capacitive sensing of the diaphragm deflection. Standard cofired ceramic laminate technology coupled with evaporation of refractory metal electrodes is used to realize the sensor.

FIGS. 8A–8D illustrate the fabrication sequence for a ceramic-tape based micromachined pressure sensor 80. As illustrated in FIG. 8A, the fabrication procedure starts with four layers of commercially available ceramic laminate tape 81, 82, 83 and 84, each layer consisting of small alumina and glass particles suspended in an organic binder. Each sheet is approximately 100 μm in thickness. The top and bottom sheets 81 and 84 are used for formation of flexible diaphragms, while holes are punched into the two center sheets 82 and 83 to form an evacuated cavity in the sensor 80. The diameter of the finished sensor is directly dependent on the diameter of the holes in sheets 82 and 83. The four sheets 81, 82, 83 and 84 are then laminated together in a press with ambient vacuum and a pressure and temperature on the order of 20 MPa and 70° C., respectively. FIG. 8B illustrates the sensor after lamination. After being laminated together, the laminated sheets are cofired in a two stage cure, first at approximately 500° C. for approximately 30 minutes, followed by firing at approximately 850° C. for approximately 20 minutes, to realize the ceramic mechanical structure. FIG. 8C illustrates the sensor after cofiring. Finally, the electrode areas 86 and 87 are metallized with a suitable electrode material, such as refractory titanium/tungsten alloy, which is deposited using DC sputtering. FIG. 8D illustrates the sensor after metallization. Sensors formed using this process have high temperature operation capability and a gauge factor of capacitance change on the order of 1.1%/bar.

Another advantage of using electronic packaging technologies for miniature reciprocating combustion-driven machine fabrication is the possibility of leveraging integrated passives technologies to wind appropriate coils in an integrated fashion during the manufacturing process. Such integrated passives technologies have been widely used to fabricate resistors, capacitors, and inductors directly in the substrate of interest. The technology used to embed inductors inside electronic packages, combined with the ceramic packaging technology, is directly applicable to fabrication of the miniature reciprocating combustion-driven machine of the present invention, and can be used to realize both the combustor and electrical generator portions of the miniature reciprocating combustion-driven machine in a single integrated package.

Figure 9A:
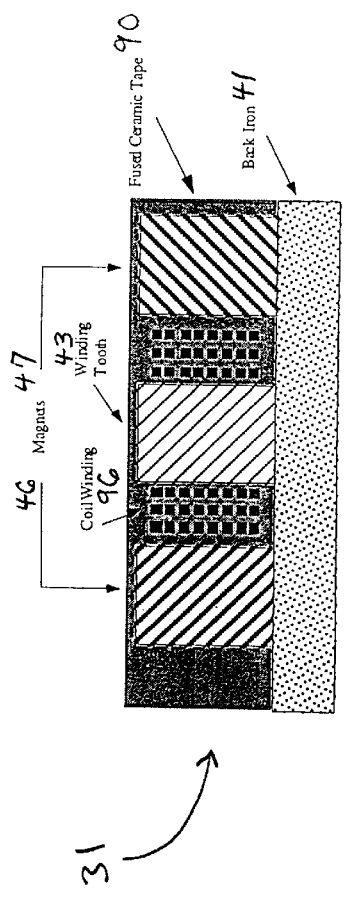
FIGS. 9A–9B are schematic diagrams illustrating how the stator of FIGS. 4A–4B can be fabricated using ceramic-based micromachining technology in accordance with an embodiment of the present invention.
Figure 9B:
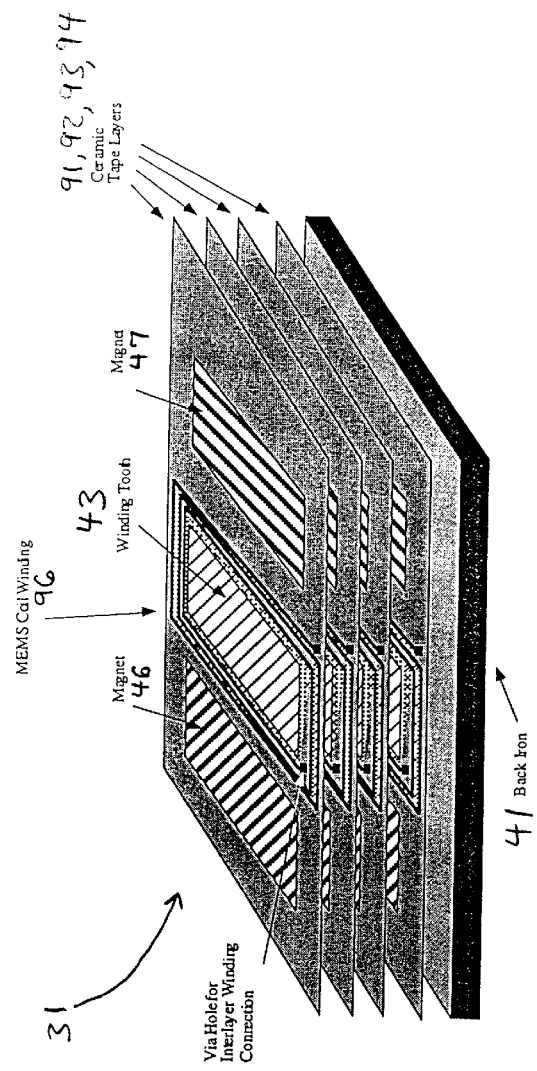

FIGS. 9A and 9B illustrate a side view and an exploded perspective view, respectively, of an embodiment of how the magnetic microactuator and this manufacturing technology can be used to fabricate an electrical generator in accordance with the present invention. Although FIGS. 9A and 9B illustrate one example of the fabrication of a permanent magnet type of generator, the same fabrication technologies are applicable to other embodiments as well. Alternatively, other micromachining fabrication technologies well-known in the art can also be employed to realize the miniature reciprocating combustion-driven machinery. FIGS. 9A and 9B illustrate how the stator 31 of FIGS. 4A and 4B can be fabricated using this technology. In FIGS. 9A–9B two distinct levels of the stator 31 are illustrated: a lower "back iron" of magnetically permeable material 41 and a region of ceramic material 90 comprised of multiple ceramic layers 91, 92, 93 and 94 (shown exploded in layer view in FIG. 9B). A coil-wound "tooth" 43 and permanent magnets 46 and 47 are disposed within the ceramic region 90 as described below. Although only one coil-wound "tooth" 43 and two permanent magnets 46 and 47 are illustrated in FIGS. 9A–9B, it should be understood that the stator 31 can be comprised of any number of permanent magnets (n) and a like number (less one) of coil-wound "teeth" (n-1).

Likewise, although the piston and complementary stator discussed above with reference to FIGS. 4A–4B are not shown in FIGS. 9A–9B, it should be understood that a piston can be disposed above and adjacent the stator 31, and that a complementary stator can be disposed above and adjacent the piston, as discussed above with respect to FIGS. 4A–4B. The two stators can be formed separately, then bonded together to enclose the piston and complete the generator.

In order to realize the windings for the coil-wound "tooth" 43, a spiral coil winding 96 is deposited within the region of ceramic material 90 using either photolithography or screen-printing. This coil winding 96 is typically made from a metal paste which will form the final conductor line during the cofiring of the ceramic layers. Electrical via holes are made in each layer of the ceramic region 90 to permit the connection of coil windings from one layer to another in series, thereby increasing the voltage generated from each wound "tooth".

In addition to spiral coil winding 96, three holes are formed in each ceramic layer 91, 92, 93 and 94. These holes are filled with magnetic materials as described below.

The back iron 41 in its simplest form is simply a sheet of magnetically soft material which extends down the length of the stator 31. This material can be integrated with the ceramic using standard lamination techniques, either during the lamination and cofiring of the ceramic sheets themselves, or, if the magnetic properties of the material are severely degraded with the relatively high cofiring temperature, after the ceramic portion has been cofired. This approach maintains the batch fabrication nature of micromachining, while at the same time allowing the use of conventionally annealed and quenched, high saturation flux density alloys.

The core of the coil 43 (i.e., the winding "tooth") is required to be a high permeability, magnetically soft material. This tooth can be formed using electroplating technology by first laminating the back iron 41 to the ceramic region 90, and then filling the winding tooth area 43 with electrodepositied magnetic alloys, making electrical contact to the back iron 41. By depositing each of the teeth in this fashion, a batch fabrication advantage of micromachining is maintained (i.e., all of the teeth are fabricated at once), and extremely good precision control in terms of tooth placement relative to the ceramic is achieved, since the electrodeposition through the ceramic is essentially a self-aligned process. Since the operating frequency of the microgenerator is low, laminations should not need to be integrated into either the back iron or the teeth (i.e., the coil losses will dominate any eddy current or hysteresis losses generated by alternating flux in the core); however, if it is determined that laminations are desirable, these deposition techniques are completely compatible with techniques for the incorporation of integrated laminations into the flux path, or with the use of nonconducting magnetically soft materials such as ferrites as known in the art.

There are at least three ways in which the permanent magnets 46 and 47 can be disposed into the ceramic region 90. The first approach is to use the multilayer ceramic technology to provide guide holes for the "drop-in" insertion of small, conventional permanent magnets into the ceramic region 90 and onto the back iron 41. Although this approach will work, and will allow the use of the highest remanence materials, a disadvantage of this approach is that it is not a batch process (i.e., all of the magnets must be assembled).

A second approach is to use electroplating techniques to deposit the magnets 46 and 47 in a similar fashion to the soft magnetic "teeth" described above. A disadvantage to this approach is that often the quality of electrodeposited hard magnetic materials is inferior to the pressed or sintered forms of these materials, a disadvantage that is far less severe with respect to magnetically soft materials. These inferior permanent magnet qualities will severely affect the performance of the permanent magnet generators.

A third approach takes advantage of the high temperature and modulus nature of the ceramic region 90. The permanent magnet sites in the ceramic region 90 can be packed with appropriate magnetic powders, and the high pressure and temperature lamination and sintering of these magnets directly into the appropriate areas of the ceramic region 90 can be performed. The magnets so produced approach the performance of conventionally-produced magnets. One difficulty with this approach is that the magnets must be alternately polarized; this can be achieved by special fixturing to concentrate magnetic flux provided by a capacitor discharging into a magnetizing coil (the usual way in which these magnets are polarized), which causes the generated flux to alternate in the desired magnetic pattern, thus imposing the correct alternating polarity onto the magnets. A small alteration of this approach is to form bonded magnets, in which the magnetic powders are suspended in an appropriate binder such as epoxy, polymide, or other materials known in the art, and this binder/magnetic material composite is packed into the recesses of the ceramic, followed by curing or setting of the binder. If the concentration of magnetic powder in the bonded magnet composites is high, good magnetic properties can be achieved.

Channels for the flow of fuel, air, and combustion products are also important parts of the miniature reciprocating combustion-driven machine. In addition, it may be necessary to build up internal "walls" within the combustion chamber to encourage appropriate combustion patterns. The walls can be produced by varying the patterns cut into various layers of ceramic tape prior to lamination. It is also possible to fabricate channels for gas flow using this technology. For example, the pressure sensor shown in FIGS. 8A–8D depends on this technology for its operation. The fabrication of ceramic pressure sensors, as illustrated in FIGS. 8A–8D and discussed above, illustrates that the same process can be used to produce airtight cavities in regions of a laminated ceramic structure.

Some of the implementations of the combustor require the realization of either flapper valves or controllable on/off valves for the fuel. These valves can also be realized using the ceramic packaging technology. For example, consider the pressure sensor schematic shown in FIG. 8D. Application of a voltage between the two electrodes 86 and 87 will cause the flexible members to be drawn closer to each other, restricting the flow space. This concept can be used to provide valves for the miniature reciprocating combustion-driven machine.

Figure 10:
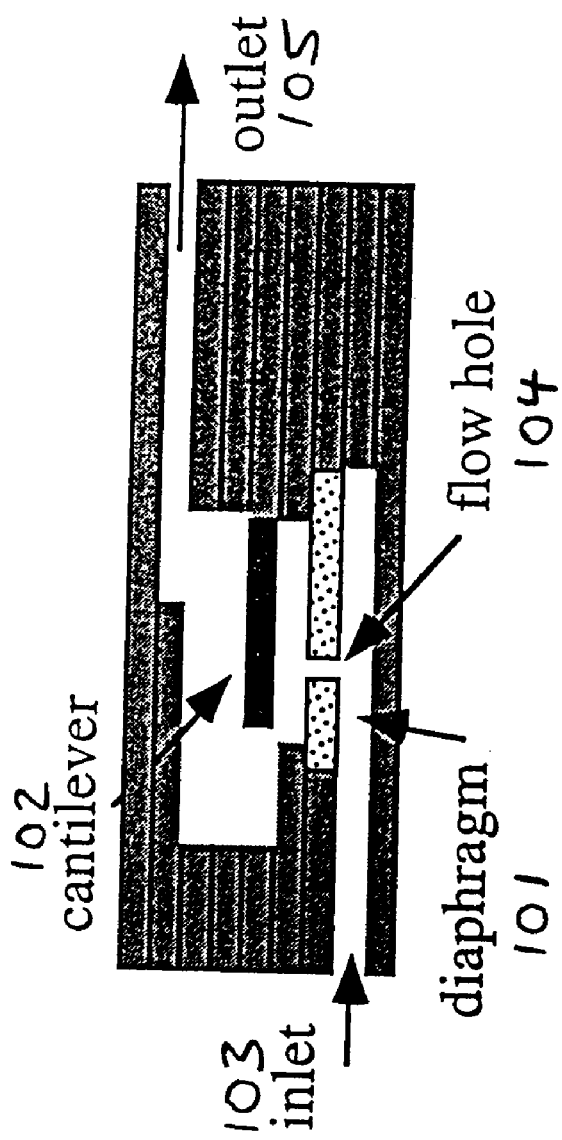
FIG. 10 is a schematic diagram illustrating a simple flapper valve implemented in ceramic multilayer technology in accordance with the present invention.

FIG. 10 illustrates a simple flapper valve implemented in ceramic multilayer technology. The ceramic diaphragm 101 is rigidly held in the depth direction and cannot move, while the cantilever beam 102 can move. Fluid entering the inlet 103 causes the cantilever beam 102 to move upward, letting the fluid flow through the flow hole 104 in the diaphragm 101 to the outlet 105. A reverse flow will cause the cantilever beam 102 to deflect downwards and cover the flow hole 104 in the diaphragm 101, thus preventing reverse flow.

While specific apparatus arrangements for implementing a miniature reciprocating combustion driven machine in accordance with the present invention are described, it should be understood that alternative apparatus arrangements are anticipated. Furthermore, it will be obvious to those skilled in the art that many variations and modifications may be made to the preferred embodiments as described above without substantially departing from the spirit and scope of the present invention. It is intended that all such variations and modifications be included within the scope of the present invention, as set forth in the following claims.

Now, therefore, the following is claimed:

1. A miniature reciprocating combustion-driven machine fabricated by micromachining, comprising:
   a first combustion chamber;
   a second combustion chamber, said second combustion chamber being substantially axially aligned with said first combustion chamber;
   a first means coupled to said first combustion chamber for introducing fuel and air into said first combustion chamber to form a combustible mixture therein;
   a second means coupled to said second combustion chamber for introducing fuel and air into said second combustion chamber to form a combustible mixture therein;
   a first controllable ignition means coupled to said first combustion chamber for igniting the combustible mixture in said first combustion chamber;
   a second controllable ignition means coupled to said second combustion chamber for igniting the combustible mixture in said second combustion chamber; and
   a piston disposed in a surrounding channel between said first combustion chamber and said second combustion chamber, said piston being free to move back and forth in the channel substantially along the axis between said first combustion chamber and said second combustion chamber.

2. The machine of claim 1, further comprising a converting means for converting the motion of said piston to electrical energy.

3. The machine of claim 1, wherein said piston is a substantially rectangular plate comprised of alternating regions of magnetic material and non-magnetic material.

4. The machine of claim 2, wherein said converting means is magnetically coupled to said piston.

5. The machine of claim 2, wherein said converting means is comprised of:
   a base, said base being formed of a material capable of conducting magnetic flux;
   a first permanent magnet disposed on said base;
   a second permanent magnet disposed on said base, said second permanent magnet having an opposite polarity than said first permanent magnet;
   a soft magnetic material disposed on said base between said first permanent magnet and said second permanent magnet; and
   a wound coil disposed on said base wound around said soft magnetic material, said coil being formed of a material capable of conducting magnetic flux.

6. The machine of claim 1, wherein said machine is a centimeter-scale machine.

7. The machine of claim 1, wherein said machine is a millimeter-scale machine.

8. The machine of claim 1, wherein said piston comprises a substantially rectangular plate having a plurality of sides, each of said sides not exceeding 10 centimeters in length.

9. The machine of claim 1, wherein said piston has a cross-sectional area not exceeding approximately 1 square centimeter.

10. The machine of claim 1, wherein said piston has a mass not exceeding approximately 50 grams.

11. A miniaturized reciprocating combustion-driven machine fabricated through micromachining, comprising:
    a combustion chamber having first and second ends;
    first and second outlet ports located adjacent said first and second ends of said combustion chamber, respectively;
    first and second fuel valves located adjacent said first and second ends of said combustion chamber, respectively;
    first and second fuel igniters arranged adjacent said first and second ends of said combustion chamber, said igniters being capable of igniting a combustible mixture introduced into said combustion chamber through said fuel valves; and
    a piston disposed within said combustion chamber between said first and second ends of said combustion chamber, said piston being free to move back and forth within said combustion chamber substantially along a longitudinal axis of said combustion chamber.

12. The machine of claim 11, wherein said piston is substantially rectangular in shape.

13. The machine of claim 12, wherein said piston comprises alternating regions of magnetic material and non-magnetic material.

14. The machine of claim 12, wherein said piston is configured as a rectangular plate.

15. The machine of claim 12, wherein said piston has a plurality of sides, each of said sides not exceeding 10 centimeters in length.

16. The machine of claim 12, wherein said piston has a cross-sectional area of not exceeding approximately 1 square centimeter.

17. The machine of claim 12, wherein said piston has a mass not exceeding approximately 50 grams.

18. The machine of claim 11, further comprising a converter capable of converting reciprocating motion of said piston into electrical energy.

19. The machine of claim 18, wherein said converter comprises at least one transducer.

20. The machine of claim 19, wherein said at least one transducer is magnetically coupled to said piston.

21. The machine of claim 11, wherein said machine is a centimeter-scale machine.

22. The machine of claim 11, wherein said machine is a millimeter-scale machine.

* * * * *

UNITED STATES PATENT AND TRADEMARK OFFICE
CERTIFICATE OF CORRECTION

PATENT NO. : 6,109,222
DATED : August 29, 2000
INVENTOR(S) : Glezer, et al.

It is certified that error appears in the above-identified patent and that said Letters Patent is hereby corrected as shown below:

Abstract,
Line 2, add a period (-- . --) after "disclosed."

Column 4,
Line 54, delete "ti" and replace it with -- it --.

Column 5,
Line 32, delete "magnetically" and replace it with -- magnetic --.

Signed and Sealed this

Thirtieth Day of October, 2001

*Attest:*

NICHOLAS P. GODICI
*Attesting Officer*     Acting Director of the United States Patent and Trademark Office